2,843,538

ELECTROLYTIC PROCESS FOR LEACHING PRECIOUS METALS

Ole Wilhelm Haugen, Oslo, Norway

No Drawing. Application October 1, 1954, Serial No. 459,871

4 Claims. (Cl. 204—130)

This application is a continuation-in-part of application Serial No. 57,833, filed November 1, 1948, now abandoned.

The invention relates to a process for recovering precious metals, such as gold, silver, platinum, palladium and iridium in the cyanide-leaching treatment whereby improved recovery in the leaching process is attained by passing direct electric current through the aqueous leaching bath containing the alkali cyanide leaching reagent and about 1.5 to 4 parts of solid pulverized ore to about 1 part of said solution.

In accordance with the invention direct current is passed through the leaching bath for a period of time sufficient to remove substantially all of the precious metal from the ore and bring it into solution in accordance with the equation below, gold being used as an example:

$$4Au + 8KCN + O_2 + 2H_2O = 4KAu(CN)_2 + 4KOH$$

The known process which is illustrated by the above equation treats the pulverized ore with dilute aqueous sodium or potassium cyanide and adds oxygen in the form of air to produce the soluble precious metal salt. It is known that the leaching action in accordance with the above equation fails to provide recoveries of more than about 40 to 70% despite increasing the time of treatment and despite reducing the particle size of the ore to promote contact of the ore with the leaching solution for extraction.

It is surprising that in accordance with the invention, substantially 100% recovery is attained and valuable precious metals are recovered from ores which previously defied complete extraction by passing direct current through the aforesaid leaching solution having the ratio of solution to ore or pulp as above mentioned and to require a current consumption of about 1 to 2 amperes per ton of dry ore at a preferred voltage of about 6 to 8 volts.

An object of the invention is to provide an improvement in the alkali cyanide leaching treatment comprising passing direct current at 6 to 8 volts through said solution within the ratio of 1.5 parts to 4 parts of solid pulverized ore to 1 part of said leaching solution.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

It is necessary to maintain the voltage at 6 to 8 volts and to use a low current consumption of 1 to 2 amperes per ton of ore, in accordance with the invention. It has been found that increasing the current consumption to about 50 to 120 amperes per ton of ore and reducing the voltage below 6 or increasing the voltage above 8 causes a precipitation and deposition of gold on the cathode used for passing direct current into the solution. When gold deposits on the cathode it is necessary to stop the passage of current and the electrolyzed film of metal is redissolved by the leaching solution, it being thereby necessary however to wait for complete dissolution of the film which is in a less subdivided state than the original ore and which takes a considerable period of time.

In accordance with the invention contact times of the solution with the ore, which ore may be a beach sand for example, vary to about 4 to about 8 hours, the optimum time being about 6 or 7 hours and being more than sufficient at the higher value of time to provide for 100% recovery of the precious metal by the leaching treatment.

The state of subdivision of the ore or sand is usually sufficient at about 100 mesh to 200 mesh although higher states of subdivision may be used for ores or slimes which are known to be more difficult to extract with the alkali cyanide solution.

As a result of the low current requirement of about 1 to 2 amperes per ton of dry ore, a highly economical and technically important improvement is attained which recovers precious metal values heretofore lost in the leaching treatment and the collection of cyanide slimes hitherto practiced for subsequent concentration and recovery is no longer necessary.

It is known that electric current can be used during the cyanide leaching process as disclosed in U. S. Patent No. 998,749, dated July 25, 1911. However this treatment is partially an electrolysis which results in depositing the precious metal on the cathode to require interruption of the treatment and redissolution of the deposited film in order to provide for the recovery of the precious metal in the later stage of the process by the usual chemical reduction treatment. In contrast to this, the present process is not electrolysis because the direct current used exclusively serves the purpose of accelerating the dissolution of the precious metals into the solution of alkali cyanide. The electric current which is used, in U. S. Patent No. 998,749 is used in the presence of iodide, such as potassium iodide which combines with the alkali cyanide or sulfo cyanide to form cyanogen iodide which acts as a solvent for gold for example but which does not prevent the electrolytic deposition on the cathode during the process as explained above. In fact, the experience has been that electrolytic treatment tends to destroy the cyanide by converting it into cyanate through the action of nascent oxygen liberated by the electric current and the leaching power is substantially reduced since cyanate is not a solvent for the gold. This view is regarded in some quarters as explaining the difficulty of improving leaching recovery beyond 40 to 70% in the air bubbling cyanide leaching process.

It is surprising indeed that the opposite result has been discovered by reducing the current requirement through the use of a critical current and voltage of 6 to 8 volts direct current and 1 to 2 amperes per ton of ore through the leaching solution which obviates electrolytic deposition and which maintains high solvent efficiency throughout the treatment of from about 4 to 8 hours.

Preferred methods, however, are exemplified in the following examples. These examples are entirely illustrative and not at all limitative in character.

EXAMPLE 1

A lead lined insulated vessel is filled with an aqueous leaching solution containing 11,000 grams of sodium cyanide, 150 grams of sodium hydroxide and about 250 grams of previously burnt limestone which is thereafter slaked per cubic meter of said solution. NaCN and NaOH may be replaced by KCN and KOH.

The bottom of the vessel is provided with a wooden grill covered with sheets of lead in slightly spaced relation to each other but conductingly connected with each other. The sheets of lead are covered by a rug of for instance jute or bast, preventing the raw materials or the mass from being pushed against the sheets of lead or from penetrating between them. The sheets of lead are connected with the negative pole of a direct current dynamo. At the top of the raw materials with which said vessel is filled are placed sheets of metal for instance iron conductingly connected with each other and these sheets are connected with the positive pole of the dynamo.

The dynamo is started and the voltage is maintained at about 7 volts, which has proved to be particularly suitable for producing gold and silver. Simultaneously with the closing of the electric current oxygen is added to the mass, for instance, in the form of air, and the above solution of sodium cyanide is added to the mass at the top of the vessel, the solution descending through the mass to the bottom of the vessel and finally filling the vessel to 2-3 cm. above the level of the mass.

Beach sand was added to the solution, the salt water content being left in the beach sand. The assay of the beach sand is as follows before treatment:

Before treatment:
Head—
2.56 ozs. gold
1.0 oz. silver

The ratio of sand to solution is 10 to 6 and in a contact time of 8 hours, and passing through the solution and sand a direct current voltage of 7 volts, the recovery of gold and silver is 100%. The sand has a fineness of 90%+100 mesh on the Taylor screen and the assay of the tailings after treatment is as follows:

After treatment:
Tail—
Trace—gold
Trace—silver

Based upon the power consumed, the figure is about 1 to 2 amperes per ton dry ore at 7 volts. It was noted that reducing the voltage or increasing the voltage resulted in precipitation of gold on the cathode.

Control I

The foregoing example was repeated using an ore of fineness, —200 mesh Taylor 17.4% and having the following assays before and after treatment but in the absence of the use of direct current at a voltage of 7 volts as in Example 1. The pertinent data is summarized below:

Assays:
Before treatment, head, 0.26 oz. gold
After treatment, tails, 0.15 oz. gold
Recovery, 42%
Ratio: 1 of pulp:2.2 of solution
8 hours' contact time or treatment time

Control II

The control as in I was repeated and the following data is summarized:

Assays:
Before treatment, 0.40 oz. gold
After treatment, 0.11 oz. gold
Recovery, 72.2%
Ratio: 1 of pulp to 0.92 of solution
6 hours' contact time The cyanide strength in both control examples above are the same. The fineness is —200 mesh pulp as in Control No. I.

EXAMPLE 2

Beach sand as in Example 1 and using direct current at 7 volts, 1 to 2 amperes per ton of ore was used with the same beach sand of fineness 90%+100 mesh Taylor and the follownig results were obtained:

Assays:
Before treatment, head, .45 oz. gold
After treatment, tail, .0025 oz. gold
Recovery, 99.44%
Contact time, 8 hours
Ratio: 3 of pulp:1 of solution

EXAMPLE 3

The beach sand of Example 1 was treated under the same conditions but for a contact time of 6 hours and using a ratio of pulp to solution of 4 to 1. 100% recovery was obtained.

EXAMPLE 4

The beach sand of Example 2 was treated under the same conditions but for a contact time of 6 hours and using a ratio of pulp to solution of 4 to 1. 100% recovery was obtained.

An improvement in leaching is definitely shown at higher ratios of pulp to solution of 3 to 1 to about 4 to 1 particularly when the assay before treatment is lower and these lower gold bearing ores are the ores which are the most difficult to treat.

The solution of each of the above examples after treatment is withdrawn from the bottom of the vessel and is lead to one or more precipitating vessels to which zinc dust is added and the solution stirred by means of a circulation pump. The precipitated gold and silver is recovered in the precipitating vessels in known manner and worked up thereafter as desired.

It is thought that the invention and its advantages will be understood from the foregoing description and it is apparent that various changes may be made in the form, composition and arrangement of the ingredients without departing from the spirit and scope of the invention or sacrificing its material advantages, the forms hereinbefore described being merely preferred embodiments thereof.

What is claimed is:

1. In a process for the recovery of precious metals, especially gold and silver, by the cyanide-leaching process, that improvement in leaching the precious metal-containing starting material in a fine state of subdivision comprising the following steps: exposing the starting material to a solution containing about 10,000 grams of an alkali metal cyanide, 150 grams of an alkali metal hydroxide and 250 grams of slaked lime per cubic meter of said solution, in the presence of oxygen, the ratio of starting material to said solution being about between 1.5 to 1 to about 4 to 1 and simultaneously passing direct electric current at a constant voltage of from 6 to 8 volts through said solution for a period of about 4 to 8 hours with a current consumption of about 1 to 2 amperes per ton of dry starting material, whereby said starting material is leached of its precious metal-containing values in accordance with the equation below, exemplified by gold:

$$4Au + 8KCN + O_2 + 2H_2O = 4KAu(CN)_2 + 4KOH$$

2. A method as claimed in claim 1 wherein said precious metal is gold.

3. A method as claimed in claim 1 wherein said precious metal is silver.

4. A method as claimed in claim 1 wherein said ratio of starting material to solution is about 3 to 1 and said voltage is 7 volts.

References Cited in the file of this patent

UNITED STATES PATENTS

| | | |
|---|---|---|
| 775,597 | Cassel | Nov. 22, 1904 |
| 998,749 | Clancy | July 25, 1911 |
| 1,082,596 | Kitsee | Dec. 30, 1913 |